March 19, 1929.  H. P. SLEEPER  1,705,687

RELAY SYSTEM

Original Filed March 31, 1926

WITNESSES:
R. S. Williams
E. R. Evans

INVENTOR
Harvey P. Sleeper
BY
Wesley G. Carr
ATTORNEY

Patented Mar. 19, 1929.

1,705,687

UNITED STATES PATENT OFFICE.

HARVEY P. SLEEPER, OF NEWARK, NEW JERSEY.

RELAY SYSTEM.

Application filed March 31, 1926, Serial No. 98,663. Renewed October 26, 1928.

My invention relates to relay systems, and particularly to relay systems for the protection of electrical generating stations or substations against ground faults.

One object of my invention is to provide a relay protective system for an electrical station that includes differentially balanced devices, but which operates only upon an unbalance caused by a ground fault in the station.

A further object of my invention is to provide a relay protective system for a transformer substation having a grounded neutral in which means is provided for disconnecting the substation upon the occurrence of an unbalance between the energy input and output of the station accompanied by a flow of current in the neutral conductor.

It has been proposed to protect electrical stations or apparatus units by the use of differentially balanced relays responsive to an unbalance between the energy input and output of the station or unit. However, a balanced arrangement of this kind results in occasional trouble on account of the fact that the breaking or grounding of one of the relay conductors destroys the balance and disconnects the station, even though there is no fault in the main circuits of the station. A disconnection of this kind is a serious matter where the entire station is disconnected from the system because it causes an interruption of service. The object of my invention is to obviate the possibility of such accidental interruptions of service.

Short-circuits between the respective phase conductors of a station or apparatus unit cause excessive current to flow and are protected against by the usual differentially connected over-current relays. The other type of fault which causes appreciable trouble is an arc or a failure of insulation between one of the phase conductors of the station and ground. Ground faults of this character may be detected by means of the usual ground relay. However, such relays are also responsive to ground faults outside of the station and, in the case of such faults, cause an unnecessary disconnection of the station from service.

In accordance with my invention, protection against ground faults is provided by means of a combination of differential protection and a ground relay so arranged that the station is disconnected from service only when an unbalance in the energy input and output of the station is accompanied by a fault current to ground.

Figure 1:
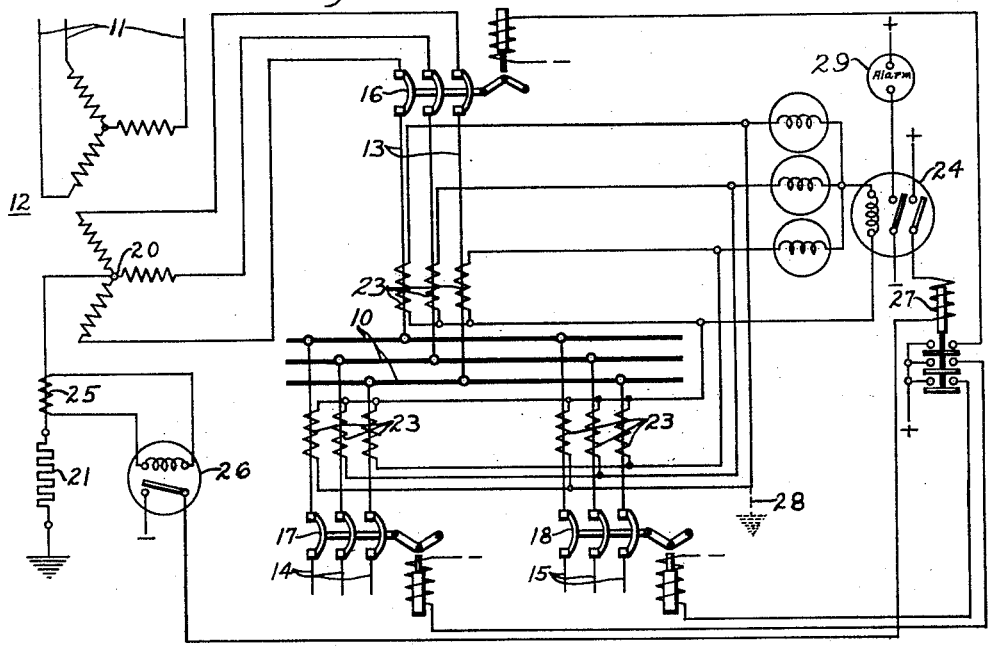
Figure 2:
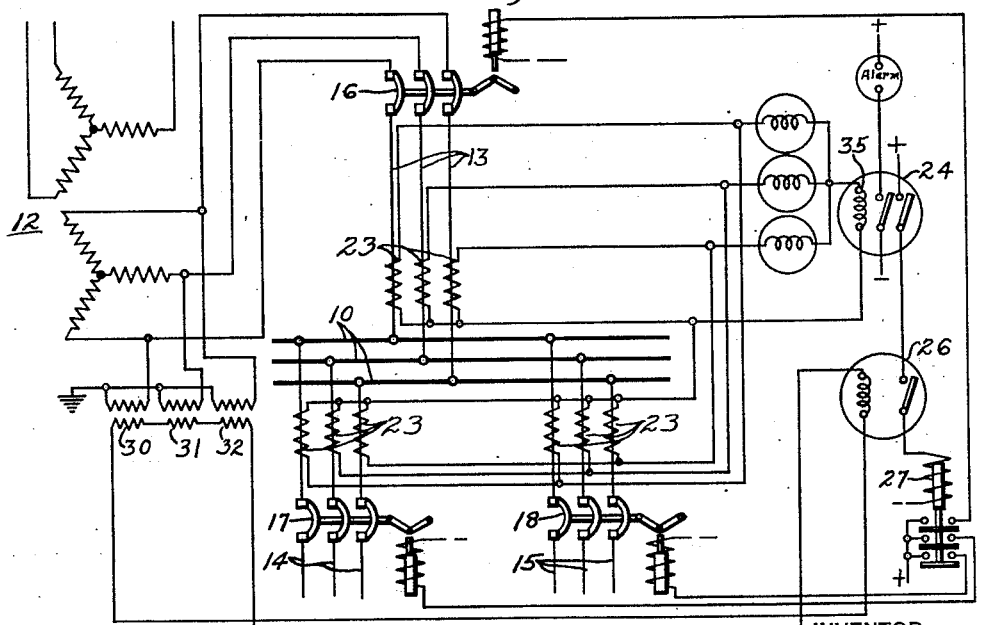

For a clearer understanding of my invention, reference should be had to the accompanying drawing, wherein Figure 1 is a diagrammatic view of a transformer substation embodying my invention, and Fig. 2 is a similar view of a modification thereof.

Referring to Fig. 1, a transformer substation comprises bus-bars 10 energized from a high-potential supply circuit 11 through the power transformer 12 and an input circuit 13. A plurality of output or feeder circuits 14 and 15 are connected to the bus-bars 10.

Circuit-interrupters 16, 17 and 18 are disposed in the input and output circuits to disconnect the station upon the occurrence of a fault upon the bus-bars 10. The neutral point 20 of the secondary winding of the transformer 12 is grounded through a resistor 21.

Any known means for balancing the energy input and output of the bus-bars 10 may be employed. I have shown, for this purpose, sets of current transformers 23 in the respective phase conductors of the input and output circuits, the transformers in the output circuits being connected cumulatively with respect to each other and in opposition to the current transformers in the input circuit. An over-current relay 24 is connected to the respective sets of current transformers in such manner that normally no current traverses its windings, but upon an unbalance between the energy input and output to the bus bars 10, current flows through the winding of the relay and the relay is operatively energized.

A current transformer 25 is connected in the neutral conductor of the main transformer 12 and the secondary winding thereof is connected to the over-current relay 26. Upon the occurrence of a predetermined current in the neutral conductor, the relay 26 is operatively energized. It will be understood, however, that no current flows in the neutral conductor unless the bus-bars 10 are grounded or a ground occurs upon the supply circuit 11 or the distribution circuits 14 and 15.

Upon the occurrence of a ground on the bus-bars 10, relays 24 and 26 become energized and a circuit is closed from battery through the contact members of relay 26, the winding of an auxiliary relay 27, and the contact members of relay 24, whereupon the relay 27 becomes energized. The operation of relay 27 energizes the trip coils of the circuit-interrupters 16, 17 and 18 and disconnects the station from the system.

The station will not be disconnected unnecessarily from service upon the occurrence of a ground fault outside of the station or upon the accidental operation of the relay 24.

The relay 26 becomes operatively energized upon the occurrence of a fault outside of the station, but the relay 24 is not energized. Consequently, the station is not disconnected from service, the ground fault on the transmission circuit being taken care of by protective means individual to the circuit in the usual manner. In case one of the relay conductors becomes grounded, as indicated at 28, the relay 24 is operatively energized, but does not disconnect the station from service because the relay 26 is not energized under these conditions. However, the relay 24 may be arranged, as shown, to actuate an alarm device 29 to call attention to the fact that trouble has occured on the relay circuits.

Various modifications of the system shown in Fig. 1 will occur to those skilled in the art. I have shown one modification of the system in Fig. 2, which illustrates the application of my invention to an ungrounded substation. As shown in Fig. 2, the neutral point of the transformer 12 is ungrounded, although it is understood that the system is grounded at some other point.

The system shown in Fig. 2 corresponds to that shown in Fig. 1, except that three potential transformers 30, 31 and 32 of the instrument type are so connected to the circuit that they energize the ground relay 26. A relay 24 is provided, as in Fig. 1, for the differential protection of the bus-bars 10. The primary windings of the potential transformers 30, 31 and 32 are connected in star and the secondary windings in delta. The neutral connection of the primary windings is grounded. The relay 26 is connected within the delta formed by the secondary windings of the transformers 30, 31 and 32. This relay will receive voltage only when a ground exists on the high tension system. The winding 35 of the relay 24 is connected to the differentially-related current transformers 23 in the input and output circuits in exactly the same manner as the winding of the relay 24 in Fig. 1.

Upon the occurrence of a ground fault upon the bus-bars 10, the current relay 24, and the overvoltage relay 26 are operatively energized. The concurrent operation of relays 24 and 26 energizes the relay 27 and disconnects the station from the system. The operation of the relays is the same as in the case of those shown in Fig. 1 and need not be described in detail.

Various other modifications may be made within the scope of my invention and, consequently, I do not wish to be limited in scope, except as limitations may be indicated in the appended claims.

I claim as my invention:

1. A relay protective system for an electrical system having input and output circuits comprising a relay so connected as to be operative upon the occurence of an unbalance between the power traversing said input and output circuits, a second relay responsive to a ground fault on said electrical system and means responsive only to the operative energization of both of said relays for controlling said input and output circuits.

2. A relay protective system for an electrical system having input and output circuits comprising differentially-related transformers in the respective circuits, a relay connected thereto, a second relay responsive to a ground fault on said electrical system and means jointly controlled by said relays for controlling said input and output circuits.

3. A relay protective system for an electrical system having input and output circuits comprising a relay so connected as to be operated upon the occurrence of an unbalance between the power traversing said input and output circuits, a transformer having star-connected windings associated with said system, a ground connection for the neutral point of said windings, a second relay responsive to the flow of current in said neutral connection and means jointly controlled by said relays for controlling said input and output circuits.

In testimony whereof, I have hereunto subscribed my name this 12th day of March, 1926.

HARVEY P. SLEEPER.